No. 883,211. PATENTED MAR. 31, 1908.
M. LEITCH.
APPARATUS FOR TREATING TIN SCRAP.
APPLICATION FILED AUG. 2, 1907.

2 SHEETS—SHEET 2.

Witnesses:
Chas. A. Pearl
Alice Morford

Inventor
MEREDITH LEITCH
By his Attorneys

UNITED STATES PATENT OFFICE.

MEREDITH LEITCH, OF SPRINGFIELD, MASSACHUSETTS, ASSIGNOR, BY MESNE ASSIGNMENTS, TO METAL PROCESS COMPANY, A CORPORATION OF NEW YORK.

APPARATUS FOR TREATING TIN-SCRAP.

No. 883,211.

Specification of Letters Patent.

Patented March 31, 1908.

Application filed August 2, 1907. Serial No. 386,716.

*To all whom it may concern:*

Be it known that I, MEREDITH LEITCH, a citizen of the United States, residing at Springfield, county of Hampden, State of Massachusetts, have invented certain new and useful Improvements in Apparatus for Treating Tin-Scrap, of which the following is a full, clear, and exact description.

My invention relates to apparatus for treating tin scrap, and has for its object to provide an apparatus suitable for treating tin scrap and similar materials whatever their form or condition.

It further has for its object to provide an apparatus which will more completely separate the solder from the dirt which is carried along by the scrap so as to do away very largely with the necessity of refining the dirt in order to recover the solder.

It further has for its object to submit the scrap to a washing bath prior to the desoldering treatment, and to carry out other useful steps in arriving at the desired result.

Figure 1:
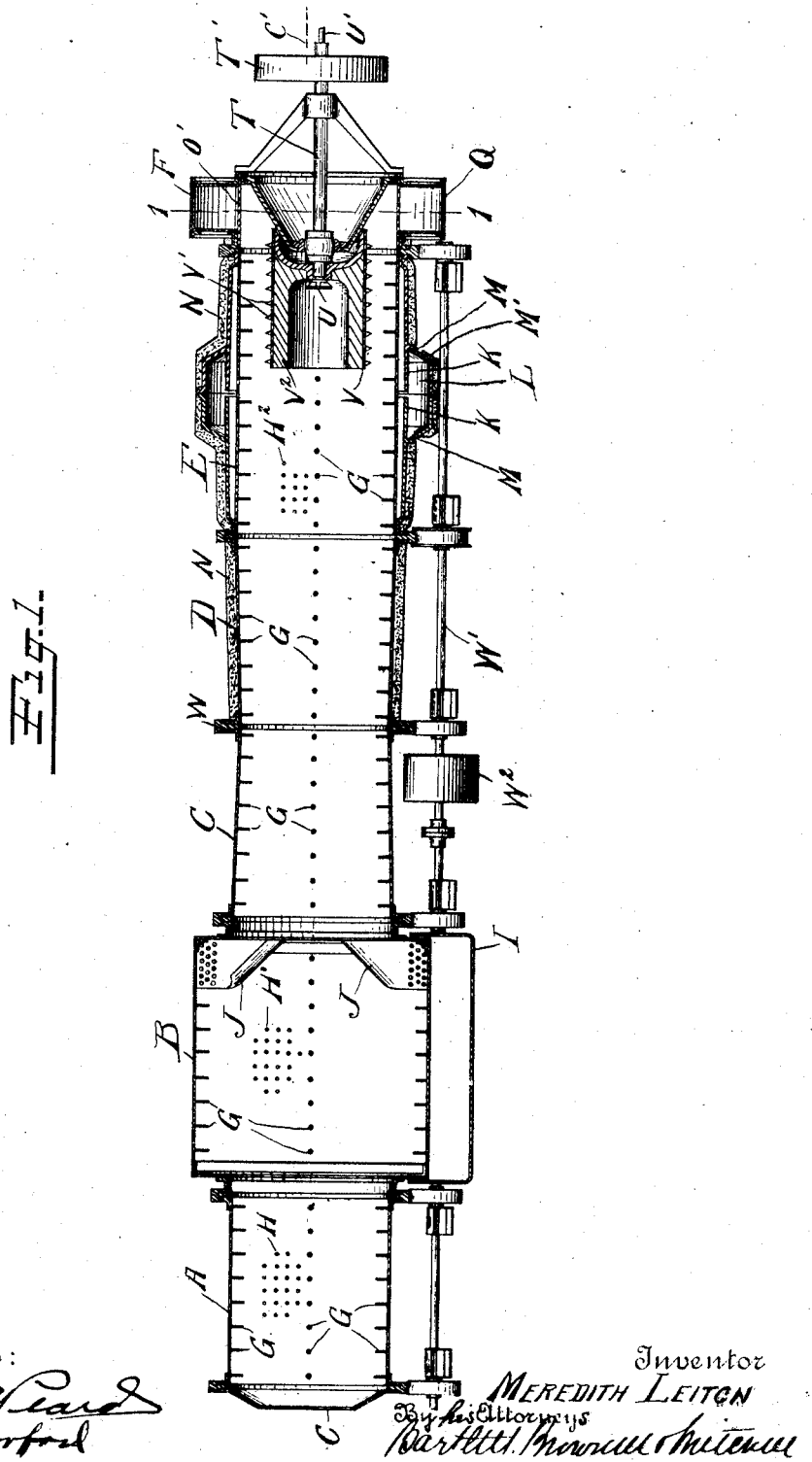
Figure 2:
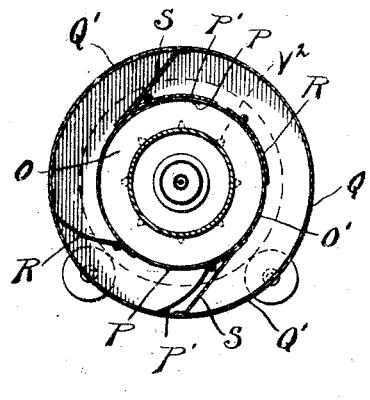
Figure 3:
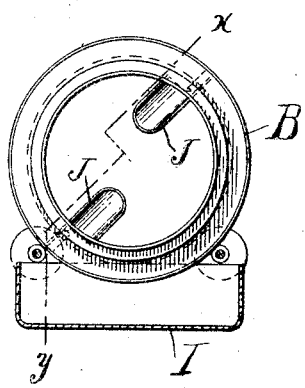
Figure 4:
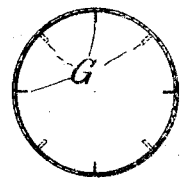
Figure 5:
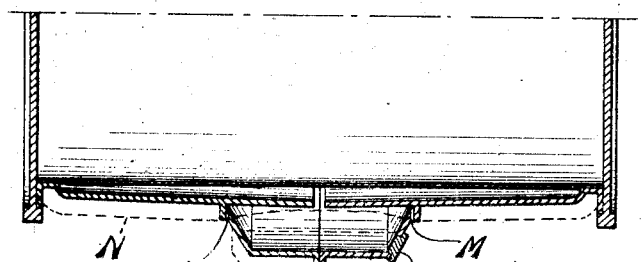

An embodiment of my invention is shown in the accompanying drawings, in which:

Figure 1 is a longitudinal section of the apparatus on the line X Y, of Fig. 3. Fig. 2 is a section through the mechanical trap at the right hand end of Fig. 1 on the line 1 1. Fig. 3 is an end view of the second section of Fig. 1 looking toward the left. Fig. 4 is a cross section of the left hand portion of the cylinder. Fig. 5 is an enlarged detail.

Referring more particularly to the drawings, A, B, C, D, E and F are cylindrical sections mounted so as to revolve on the same axis which is inclined so that the right hand end is slightly lower than the left hand end, the axis of the left end coinciding with the horizontal line C'. The sections A, B, C, D and E are all provided with internal projecting teeth G, there being preferably at least four series of such teeth in each section, as shown in Fig. 4, and where the apparatus is of large size other additional series of teeth are preferably added, as shown in dots in Fig. 4. The sections A, B, and E are all perforated, the perforations extending entirely over their cylindrical surfaces. These perforations are indicated at H, H', H².

The perforations H in the section A are preferably about 1¼ inches in diameter so as to sift out the larger portions of dirt, sand, gravel and the like. The perforations H' and H² in sections B and E are slightly smaller, being about 11/16" in diameter. The lower part of this section B dips into a tank I, which is filled with water for the purpose of subjecting the material to a washing process. The easily detachable dirt and large portion of the labels, etc. is thus removed from the scrap. At the right hand end of the section B are provided two scoops or lifters J, which, as the section B revolves, lifts the material which comes into contact with them upward and dumps them into the section C. The section C is slightly tapered in shape, the smaller end being toward the right. The taper is such, however, that the bottom portion slants downward toward the left, although the axis of the section has its left end inclined upward. This results in causing the water which is carried by the scrap or has been scooped up by the scoops J to flow back to the section B. The material in all the sections, on account of the inclination of the axis, moves towards the right. After leaving C it passes into the section D, which preferably expands slightly until it reaches the section E. The section E has its perforated interior embraced by two surrounding guides K, K, between which is an opening. This opening is surrounded by a cylindrical chamber L and serves to catch and retain any solder which may have passed through the holes H² and dropped off the guides K. Any dirt or paper which may have come with the solder into the chamber L floats on top of it, and as the chamber L becomes somewhat filled, sifts out two narrow slits some four or six inches long, M M as the structure revolves. The cylinders D and E are covered with insulation N so as to retain heat within them. As the scrap passes to the right it reaches the section F, which is a mechanical gas trap, the purpose being to permit the discharge of the scrap at this point, but to prevent the free ingress of air so that the sections D and E will be filled with a substantially deoxidized atmosphere produced in the manner hereinafter described. This trap has an inner chamber O formed by the wall O' which is the same diameter as the internal diameter of the perforated wall of the section E. This wall O' is provided with two openings P P, each of which is closed by a pivoted flap valve P'. An outer cylindrical wall Q has two openings Q', and the passages formed by the outer cylindrical walls Q and the wall O' of the chamber O are closed by valves R when those valves approach the lowest diameter. At the rear of each valve P' is a wall S, which at all times cuts off the passage from those valves to the opening Q' nearest to it. It will thus be seen that while this apparatus discharges freely the material which flows through the openings P when they are in their lowermost position, the free ingress of air through these openings P is at all times prevented.

Within the section E mounted on the shaft T is a burner-head U. The shaft T is hollow, and is in addition provided with a pipe U'. Compressed air is forced through the hollow shaft and fuel oil is forced through the pipe U' to the burner-head, which is of any suitable construction. The air and fuel are there mixed in proper proportions to produce substantially complete combustion so that the products are free of carbon and oxygen. The burner-head is surrounded by a metal casing V mounted on the shaft and provided on its exterior with projections V'. The interior of this casing is lined with fire brick or a refractory lining V², and forms a combustion chamber. The exterior of the structure consisting of the sections A to F inclusive is provided with circular projections W, which rest upon pulleys mounted upon the shaft W' driven at a slow speed by the driving pulley W². The burner-head and casing B are driven at a rapid rate by the pulley T'. As before stated the axis of the entire machine is inclined so as its right hand end is slightly lower than the horizontal C. The angle of inclination, however, is less than the angle of the sides of the section C to the axis. The projections W are in the form of circular rings to which the several sections are bolted, and thus constitute removable tracks which can be replaced in case they become worn.

The operation of the apparatus is as follows: The material is fed into the section A through the opening C, and the dirt, gravel, etc. sifted out through the openings H, it then passes into the section B where it is washed in the tank I, the refuse which is detached in this manner passing through the openings H'; it then passes through the section C where it is dried somewhat, being subjected to the products of combustion moving in the opposite direction, the water which drips from the scrap flowing down the inclined sides of the section C, back to the section B; it then passes into the section D where it is heated somewhat and then into the section E where it is brought into direct contact with the hot gases of combustion. In its course it is continually being raised by the revolution of the structure, and permitted to fall through the air to the bottom of the cylinder. The space within the sections D and E, as well as in the other sections, therefore has scrap continually falling through it, and it is in an ideal condition to be subjected to the hot blast. While in the section E, the solder is brought to such a heat that it melts and as it is dislodged from the scrap, passes through the perforations H² to the guides K into the chamber L. These guides slope toward the opening between them and assist in concentrating the particles of solder into globules which coalesce when they reach the chamber L. As the scrap reaches the right hand end of the section E it comes into contact, during its fall, with the projections V' which subject cans and the like to violent blows, tearing them apart, and also still further acts to dislodge globules of melted solder. When it reaches the section F it passes through the openings P and past the valves P' and R, and finally is discharged through the openings Q. As before stated, the lighter materials, which are carried with the scrap and pass through the openings H², float upon the solder in the chamber L, and is sifted out through the openings M. A closure M' is provided whereby the chamber L can be opened from time to time when the apparatus is stationary and the solder removed, and also the lighter materials cleaned out.

The system is closed at the right hand end except as the mechanical trap opens to discharge the tin scrap and as before explained, while discharging the tin scrap is closed against the ingress of air. The result is that the right hand end of the structure, where the material is heated, is kept filled with a deoxidized atmosphere so that the tin is not attacked in any way, but is preserved so as to be capable of being removed by other processes.

One of the advantages of this apparatus is that it is capable of treating the scrap in any form, that is in the form of cans either whole, crushed or shredded, and is also capable of treating tin cuttings for the purpose of removing any foreign matter adhering thereto. Such of the foreign matter as is not removed by the sifting and washing processes will be carbonized so as not to interfere with the subsequent detinning process. So far as the desoldering *per se* is concerned, the sections A and B and the functions which they perform can be omitted, best results are, however, obtained when the scrap is submitted to the action of all the sections. The amount of air and gas passing through the openings M is so slight as to be negligible.

What I claim is:

1. In an apparatus for treating tin scrap, the combination of a revolving cylinder having an opening at one end for receiving the material to be treated and a discharge opening at the other end sealed against the ingress of atmospheric air, and means located near the discharge end of the cylinder for maintaining a heated deoxidized atmosphere within said cylinder, the axis of said cylinder being approximately horizontal and a body having projections and located within said cylinder in the neighborhood of its discharge end, and means for rapidly revolving said body.

2. In an apparatus for treating tin scrap, the combination of a revolving cylinder having an opening at one end for receiving the material to be treated and a discharge opening at the other end sealed against the ingress of atmospheric air, and means located near the discharge end of the cylinder for maintaining a heated deoxidized atmosphere within said cylinder, the axis of said cylinder being lower at the discharge end than at the receiving end and a body having projections and located within said cylinder in the neighborhood of its discharge end, and means for rapidly revolving said body.

3. In an apparatus for treating tin scrap, the combination of a revolving cylinder having an opening at one end for receiving the material to be treated and a discharge opening at the other end sealed against the ingress of atmospheric air, and means located near the discharge end of the cylinder for maintaining a heated deoxidized atmosphere within said cylinder, the axis of said cylinder being lower at the discharge end than at the receiving end, said cylinder being provided with internal projections and a body having projections and located within said cylinder in the neighborhood of its discharge end, and means for rapidly revolving said body.

4. In an apparatus for treating tin scrap, the combination of a revolving cylinder having an opening at one end for receiving the material to be treated and a discharge opening at the other end sealed against the ingress of atmospheric air, and means for maintaining a heated deoxidized atmosphere within said cylinder, the axis of said cylinder being approximately horizontal, a combustion chamber near the discharge end of said cylinder surrounded with projections and means for rapidly revolving said projections.

5. In an apparatus for treating tin scrap, the combination of a revolving cylinder having an opening at one end for receiving the material to be treated and a discharge opening at the other end sealed against the ingress of atmospheric air, and means for maintaining a heated deoxidized atmosphere within said cylinder, the axis of said cylinder being lower at the discharge end than at the receiving end, said cylinder being provided with internal projections, a combustion chamber near the discharge end of said cylinder surrounded with projections and means for rapidly revolving said projections.

6. In an apparatus for treating tin scrap, the combination of a revolving cylinder, and means for maintaining a heated deoxidized atmosphere within said cylinder, the axis of said cylinder being approximately horizontal, said cylinder having an inner perforated wall and an outer chamber for receiving the material discharged through the perforations of said wall.

7. In an apparatus for treating tin scrap, the combination of a revolving cylinder, and means for maintaining a heated deoxidized atmosphere within said cylinder, the axis of said cylinder being approximately horizontal, said cylinder having an inner perforated wall and an outer chamber for receiving the material discharged through the perforations of said wall, said receiving chamber having an opening for automatically discharging the lighter materials that may enter it.

8. In an apparatus for treating tin scrap, the combination of a revolving cylinder having an opening at one end for receiving the material to be treated and a discharge opening at the other end sealed against the ingress of atmospheric air, and means for maintaining a heated deoxidized atmosphere within said cylinder, the axis of said cylinder being approximately horizontal, said cylinder having an inner perforated wall and an outer chamber for receiving the material discharged through the perforations of said wall.

9. In an apparatus for treating tin scrap, the combination of a revolving cylinder, and means for maintaining a heated deoxidized atmosphere within said cylinder, the axis of said cylinder being approximately horizontal, said cylinder having an inner perforated wall and an outer chamber for receiving the material discharged through the perforations of said wall, and slanting guiding means surrounding said perforated cylinder and discharging into said chamber.

10. In an apparatus for treating tin scrap, the combination of a washing cylinder and a desoldering cylinder having their axes in line and approximately horizontal, the axis at the end remote from the washing cylinder being slightly lower than at the other end, means for revolving said cylinders and means for maintaining a deoxidized atmosphere within the desoldering cylinder.

11. The combination of a washing cylinder and a desoldering cylinder having their axes in line and approximately horizontal, the axis at the end remote from the washing cylinder being slightly lower than at the other end, means for revolving said cylinders and means for maintaining a deoxidized atmosphere within the desoldering cylinder, and a tapered draining cylinder interposed between the washing cylinder and the desoldering cylinder, said cylinder having its largest end opening into said washing cylinder.

12. The combination of a washing cylinder and a desoldering cylinder having their axes in line and approximately horizontal, the axis at the end remote from the washing cylinder being slightly lower than at the other end, means for revolving said cylinders and means for maintaining a deoxidized atmosphere within the desoldering cylinder, a tapered draining cylinder interposed between the washing cylinder and the desoldering cylinder, said cylinder having its largest end opening into said washing cylinder, and a sifting cylinder opening into the end of said washing cylinder which is remote from said draining cylinder.

13. The combination of a washing cylinder and a desoldering cylinder having their axes in line and approximately horizontal, the axis at the end remote from the washing cylinder being slightly lower than at the other end, means for revolving said cylinders and means for maintaining a deoxidized atmosphere within the desoldering cylinder, and a sifting cylinder opening into the end of said washing cylinder which is remote from said desoldering cylinder.

14. In an apparatus for treating tin scrap, the combination of a cylinder, means for maintaining a heated deoxidized atmosphere within the same and a discharging trap having a circular passage provided with an opening in the inner wall at one end thereof, and an opening in the outer wall at the other end thereof and two valves, the first closing the opening in the inner wall when the second is open, and the second closing the passage when the first is open.

MEREDITH LEITCH.

Witnesses:
H. B. BROWNELL,
LANGDON MOORE.